(12) United States Patent
Langeveld et al.

(10) Patent No.: US 7,308,141 B2
(45) Date of Patent: Dec. 11, 2007

(54) APPARATUS AND METHOD TO LOCATE AN OBJECT

(75) Inventors: Pieter Cornelis Langeveld, BP Delft (NL); Karl Heinrich Van Hemert, ET Delft (NL); Johannes Hendrik Pieter Machiel Kerkhof, JD Rozenburg (NL); Jacobus Stark, ZM Rotterdam (NL)

(73) Assignee: DSM IP Assets B.V., TE Heerlen (NL)

( * ) Notice: Subject to any disclaimer, the term of this patent is extended or adjusted under 35 U.S.C. 154(b) by 660 days.

(21) Appl. No.: 10/492,900

(22) PCT Filed: Oct. 10, 2002

(86) PCT No.: PCT/EP02/11370

§ 371 (c)(1),
(2), (4) Date: Apr. 15, 2004

(87) PCT Pub. No.: WO03/034341

PCT Pub. Date: Apr. 24, 2003

(65) Prior Publication Data

US 2004/0249835 A1  Dec. 9, 2004

(30) Foreign Application Priority Data

Oct. 15, 2001 (EP) .................................. 01203920

(51) Int. Cl.
G06K 9/62 (2006.01)
(52) U.S. Cl. ...................... 382/209; 382/287
(58) Field of Classification Search .............. 382/209, 382/287, 283, 295, 141, 103, 107, 218; 348/169, 348/125; 235/462.08; 356/620, 237.1
See application file for complete search history.

(56) References Cited

U.S. PATENT DOCUMENTS

| 5,867,584 | A | * | 2/1999 | Hu et al. ................... 382/103 |
| 6,151,406 | A | | 11/2000 | Foster et al. ................ 382/147 |
| 6,751,361 | B1 | * | 6/2004 | Wagman .................... 382/287 |
| 6,798,925 | B1 | * | 9/2004 | Wagman .................... 382/287 |

FOREIGN PATENT DOCUMENTS

| JP | 404182710 A | * | 6/1992 |
| JP | 405312521 A | * | 11/1993 |
| WO | WO90/02326 | | 3/1990 |

\* cited by examiner

Primary Examiner—Anh Hong Do
(74) Attorney, Agent, or Firm—Nixon & Vanderhye P.C.

(57) ABSTRACT

Method and arrangement to locate an object with a predetermined number of marks, the arrangement comprising a light source, a sensor and a processor, by means of the following steps:—illuminating the object with the light source;—receiving an image of the object and generate image pixel data including image pixel locations and image pixel intensities for each image pixel location with said sensor;—receiving the image pixel data and storing them in a memory;—comparing said image pixel intensities with a predetermined threshold;—determining object position based on said comparing;—using a digital match mask that corresponds with said object with said marks;—finding a best match between said digital match mask and said object on said object position;—determining mark positions within said object position from said best match.

12 Claims, 5 Drawing Sheets

APPARATUS AND METHOD TO LOCATE AN OBJECT

CROSS REFERENCE TO RELATED APPLICATIONS

This application is the national phase of PCT application PCT/EP02/11370 having an international filing date of 10 Oct. 2002, which claims priority from European application number 01203920.2 filed 15 Oct. 2001. The contents of these documents are incorporated herein by reference.

FIELD OF THE INVENTION

The present invention relates to an arrangement to locate an object, comprising a light source to illuminate the object, a sensor to receive an image of the object and to generate image pixel data including image pixel locations and image pixel intensities for each image pixel location, a processor to receive the image pixel data and to store them in a memory.

PRIOR ART

Such an arrangement is known from the prior art for a wide variety of applications.

SUMMARY OF THE INVENTION

It is an object of the invention to provide an arrangement that is able to locate predetermined marks in the object with a high accuracy.

To that end, the invention provides an arrangement to locate an object with a predetermined number of marks, comprising a light source to illuminate the object, a sensor to receive an image of the object and to generate image pixel data including image pixel locations and image pixel intensities for each image pixel location, a processor to receive the image pixel data and to store them in a memory and use them to assess location and/or light-intensity and/or color of said object and/or predetermined number of marks, the processor being arranged to perform the following functions:
  comparing said image pixel intensities with a predetermined threshold;
  determining object position based on said comparing
  using a digital match mask that corresponds with said object with said marks;
  finding a best match between said digital match mask and said object on said object position;
  determining mark positions within said object position from said best match.

By using such a match mask and finding a best match between the match mask and the object on the object position, a very accurate determination of the mark positions is possible. Preferably, the mark positions form together a matrix or part of a matrix of at least two mark positions, preferably at least four mark positions. With the term 'matrix' is meant to be understood any casing suitable for holding arrays of samples in the broad sense, either directly (for example as wells on a microtiter plate) or indirectly (for example as containers like test tubes in a test tube rack). Suitable matrices may also be matrices that can be broken, cut or divided by other means into smaller matrices depending on the number of containers or wells that is required.

Preferably, the object is a holder or a holder with marks such as containers for holding test samples. In an embodiment, the arrangement is part of an apparatus for detecting residues possibly present in test samples, as described and claimed in co-pending European patent application number 01203936.8 filed on the same day as the present application. After the positions of the containers holding the test samples are accurately determined with the arrangement according to the present invention, it is easier to detect possible residues by measurements on the test sample positions, e.g., by color change measurements, as will be further explained below. Optionally, the object, viz the holder and/or the containers for holding test samples, may contain additional marks that can be recognized by the processor by comparison with pre-loaded data sets. Suitable examples of said additional marks are barcodes, bumps, figures, numbers, pits, rings, text, trademarks, and the like.

The present invention also relates to a method to be carried out by an arrangement to locate an object with a predetermined number of marks, the arrangement comprising a light source, a sensor and a processor, the method comprising the following functions:
  illuminating the object with the light source;
  receiving an image of the object and generate image pixel data including image pixel locations and image pixel intensities for each image pixel location with said sensor;
  receiving the image pixel data and storing them in a memory;
  comparing said image pixel intensities with a predetermined threshold;
  determining object position based on said comparing;
  using a digital match mask that corresponds with said object with said marks;
  finding a best match between said digital match mask and said object on said object position;
  determining mark positions within said object position from said best match.

In another embodiment, the invention relates to a computer program product to be loaded by an arrangement to locate an object with a predetermined number of marks, the arrangement comprising a light source, a sensor and a processor, the computer program product, after being loaded by said arrangement, providing said arrangement with the following functions:
  illuminating the object with the light source;
  receiving an image of the object and generate image pixel data including image pixel locations and image pixel intensities for each image pixel location with said sensor;
  receiving the image pixel data and storing them in a memory;
  comparing said image pixel intensities with a predetermined threshold;
  determining object position based on said comparing;
  using a digital match mask that corresponds with said object with said marks;
  finding a best match between said digital match mask and said object on said object position;
  determining mark positions within said object position from said best match.

Finally, the invention is also directed to a data carrier provided with a computer program product as defined above.

BRIEF DESCRIPTION OF THE DRAWINGS

The invention will be explained with reference to some drawings. The drawings are not intended to limit the scope of protection of the present invention but only to illustrate the invention. The invention itself is only limited by the scope of the annexed claims.

DESCRIPTION OF THE PREFERRED EMBODIMENT

Figure 1:
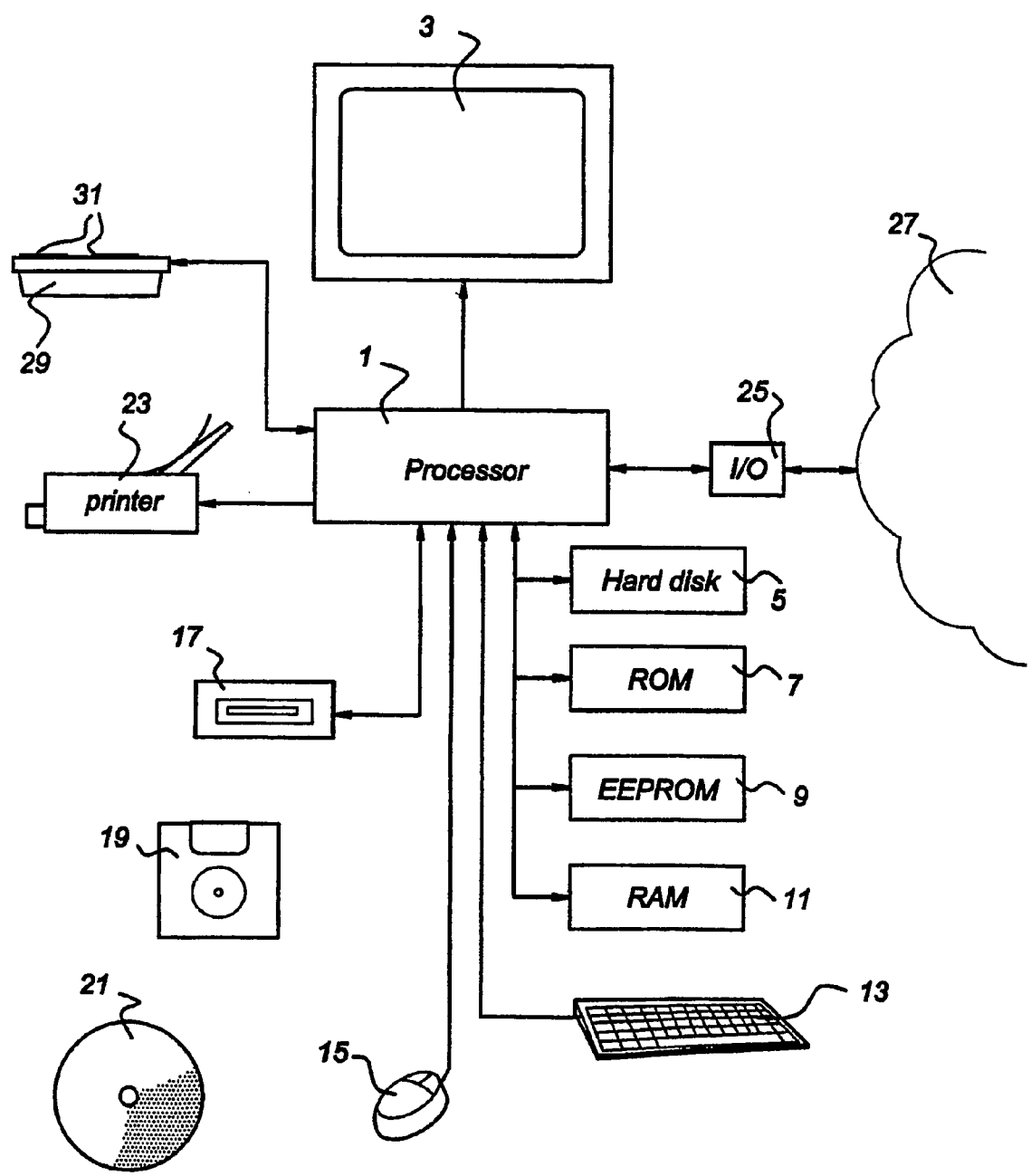
FIG. 1 shows a block diagram of the arrangement that can be used to carry out the present invention.

In FIG. 1, an overview is given of an arrangement that can be used to carry out the method according to the invention. The arrangement comprises a processor 1 for carrying out arithmetic operations.

The processor 1 is connected to a memory component or to a plurality of memory components, for example a hard disk 5, Read Only Memory (ROM) 7, Electrically Erasable Programmable Read Only Memory (EEPROM) 9, and Random Access Memory (RAM) 11. Not all of these memory types need necessarily be provided. Moreover, these memory components need not be located physically close to the processor 1 but may be located remote from the processor 1.

The processor 1 is also connected to means for inputting instructions, data etc. by a user, like a keyboard 13, and a mouse 15. Other input means, such as a touch screen, a track ball and/or a voice converter, known to persons skilled in the art may be provided too.

A reading unit 17 connected to the processor 1 is provided. The reading unit 17 is arranged to read data from and possibly write data on a data carrier like a floppy disk 19 or a CDROM 21. Other data carriers may be tapes, DVD, etc, as is known to persons skilled in the art.

The processor 1 may also be connected to a printer 23 for printing output data on paper, as well as to a display 3, for instance, a monitor or LCD (Liquid Crystal Display) screen, or any other type of display known to persons skilled in the art.

The processor 1 may be connected to a communication network 27, for instance, the Public Switched Telephone Network (PSTN), a Local Area Network (LAN), a Wide Area Network (WAN), etc. by means of I/O means 25. The processor 1 may be arranged to communicate with other communication arrangements through the network 27.

The processor 1 may be implemented as stand alone system, or as a plurality of parallel operating processors each arranged to carry out subtasks of a larger computer program, or as one or more main processors with several sub processors. Remote processors communicating with processor 1 through the network 27 may even carry out parts of the functionality of the invention.

All connections may be physical connections, however, wireless connections are also included within the scope of the invention.

The processor 1 is also connected to a scanner 29, e.g., a HP 6300C Scanjet. On top of the scanner one or more objects can be located. Photographic images of said objects may also be placed on top of the scanner. Alternatively, a device that can perform the same function as the scanner 29 may replace the scanner 29. Such a device may be a digital photo or video camera, a web cam apparatus or the like. Said devices may be arranged in such a manner that images from the object to be located can be conveniently collected. Preferably, the object is placed in a position above the lens of said device, for instance by using a mounting construction and/or a carrying area of transparent material such as a glass plate. The distance between the lens of said device and the object to be located is preferably less than one meter, more preferably less than 0.5 meter, most preferably less than 0.1 meter.

By carrying out certain functionalities by a central processor through a WAN such as the Internet, additional advantages can be realized. In this way, all users will use the same and the latest software versions, irrespective of their localization. Thus, the risk that in some cases outdated software is used, is circumvented. Drawbacks of using outdated software are e.g. the fact that the latest legislative requirements are not incorporated, corrections with regard to deviating scanners 29 or objects are not incorporated, and results obtained by different users cannot be uniformly interpreted. Any person or organization, e.g. the manufacturer of the test systems or a regulatory institute, may operate the central processor. Thus, an additional advantage is that the manufacturer of the test systems or the regulatory institute can equip test systems with individual codes that are e.g. related to the production batch so that specifically tailored programs on the central processor can be accessed using the code. Preferably, access to said central processor is achieved using the Internet by means of personalized access code systems that are well known to the person skilled in the art. Alternatively, objects can be scanned or photographed by a user and the digital or analogous image resulting from this scan or photograph can then be send in various ways, i.e. by electronic mail, to the manufacturer of the test systems, a regulatory institute or others for further processing such as calibration or the like.

In accordance with the invention, the object has marks that can be distinguished from the rest of the object. Preferably, the object is a test tube array or microtiter plate 31 (alternatively called "multiplate") arranged to comprise test samples. In a preferred embodiment of the invention, these test samples are parts of a human or animal body, or parts of plants or trees. Test samples also include meat tissue fluid, milk, blood and eggs. Other examples are given below.

Figure 2:
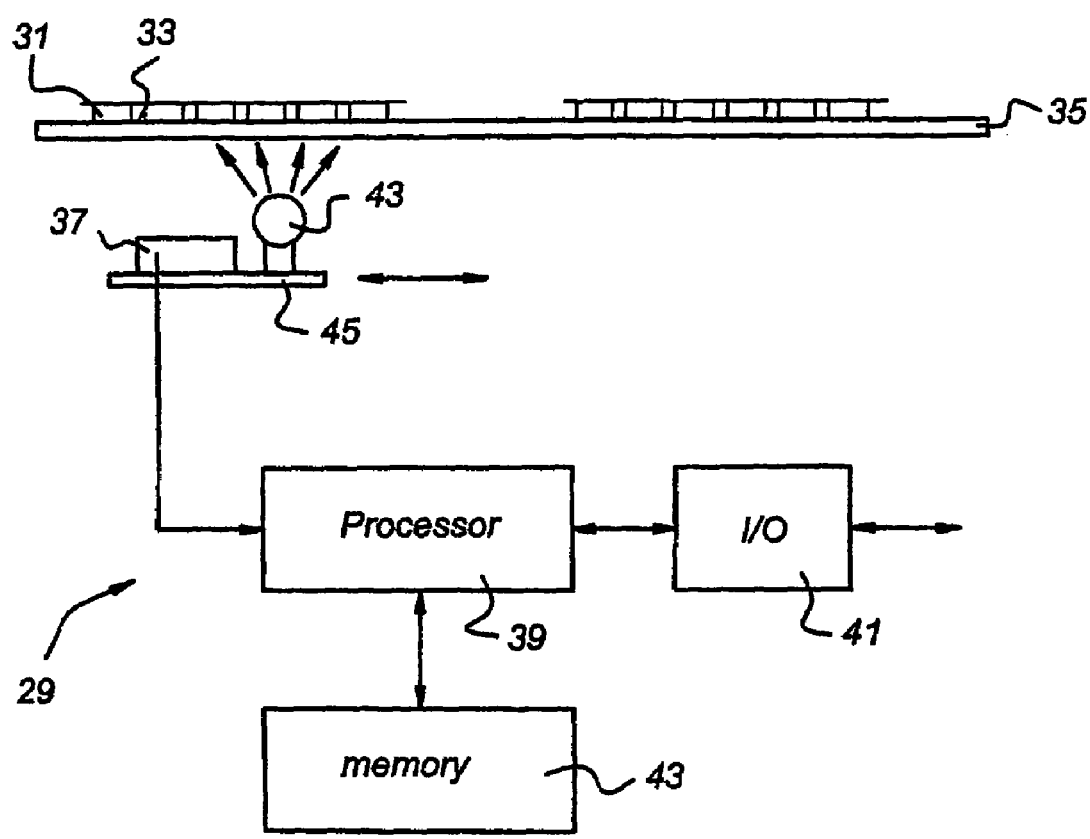
FIG. 2 shows some details of a scanner that can be used in the present invention.

FIG. 2 shows some more details of a possible embodiment of the scanner 29. Others may be apparent to persons skilled in the art of scanners. The invention is not restricted to one type of scanner and also encompasses alternative devices that can perform the same function as a scanner.

The scanner 29 comprises a transparent plate 35, e.g., made of glass or plastic. On top of the transparent plate 35 one or more objects are located. The objects shown are microtiter plates or test tube racks 31 with containers 33 for containing samples to be tested.

Below the plate 35, a sensor 37 is located. The sensor 37 can be moved by a driver (not shown), e.g., a motor, parallel to the plate to sense all objects on the plate 35. In order for the sensor to be able to sense the objects, a light source 43 is provided supported by a supporting member 45 that also supports the sensor 37. Thus, the light source 43 and the sensor 37 move together. The light source 43 may be an incandescent lamp or a gas discharge lamp. The sensor 37 may comprise CCD (Charge Coupled Device) elements. The sensor 37 may be of any other type known to persons skilled in the art. It is not strictly necessary that the light source 43 and the sensor 37 move together.

The sensor 37 is connected to a processor 39. The processor 39 is connected to a memory 43. The memory 43 may be implemented in the same way as the memories 5, 7, 9, 11 in FIG. 1, i.e., it may be a single memory or may include several memories of different types.

The processor 39 is connected to an I/O (Input/Output) device 41 that is arranged to communicate with processor 1 (FIG. 1).

Thus, the arrangement shown in FIGS. 1 and 2 comprises two processors 1, 39. This is because scanner 29 is preferably a standard scanner that is commercially available. However, it will be evident to a person skilled in the art that one can design a dedicated arrangement having only one processor performing all functions.

Figure 3A:
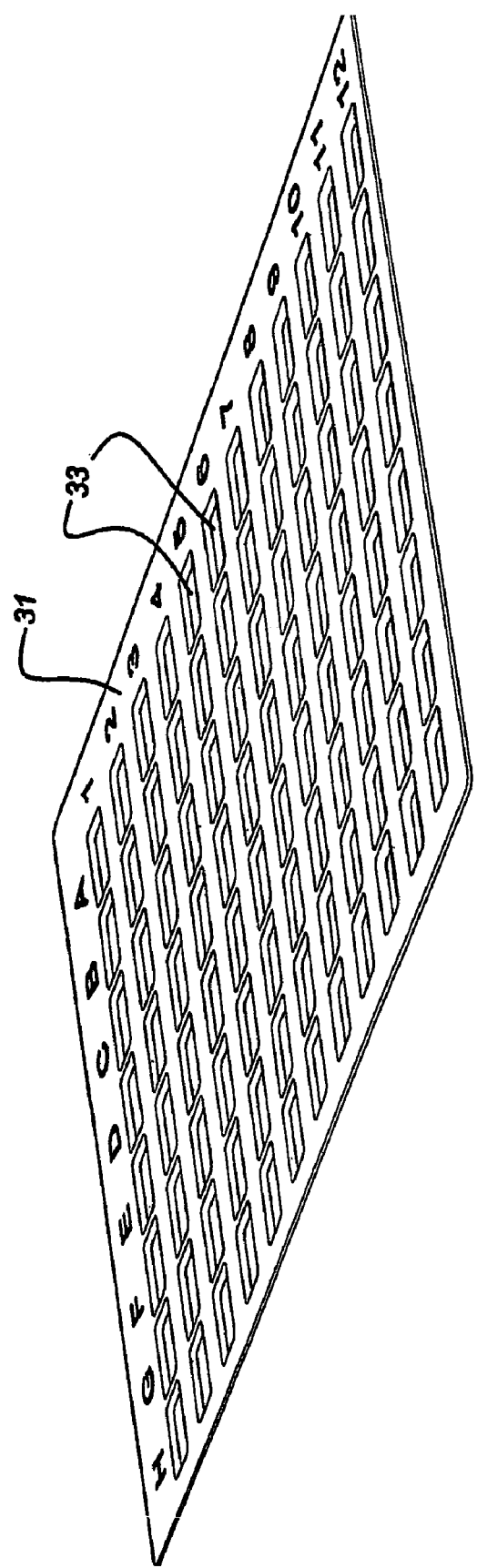
FIG. 3a shows a microtiter plate comprising a plurality of containers to contain samples to be investigated.
Figure 3B:
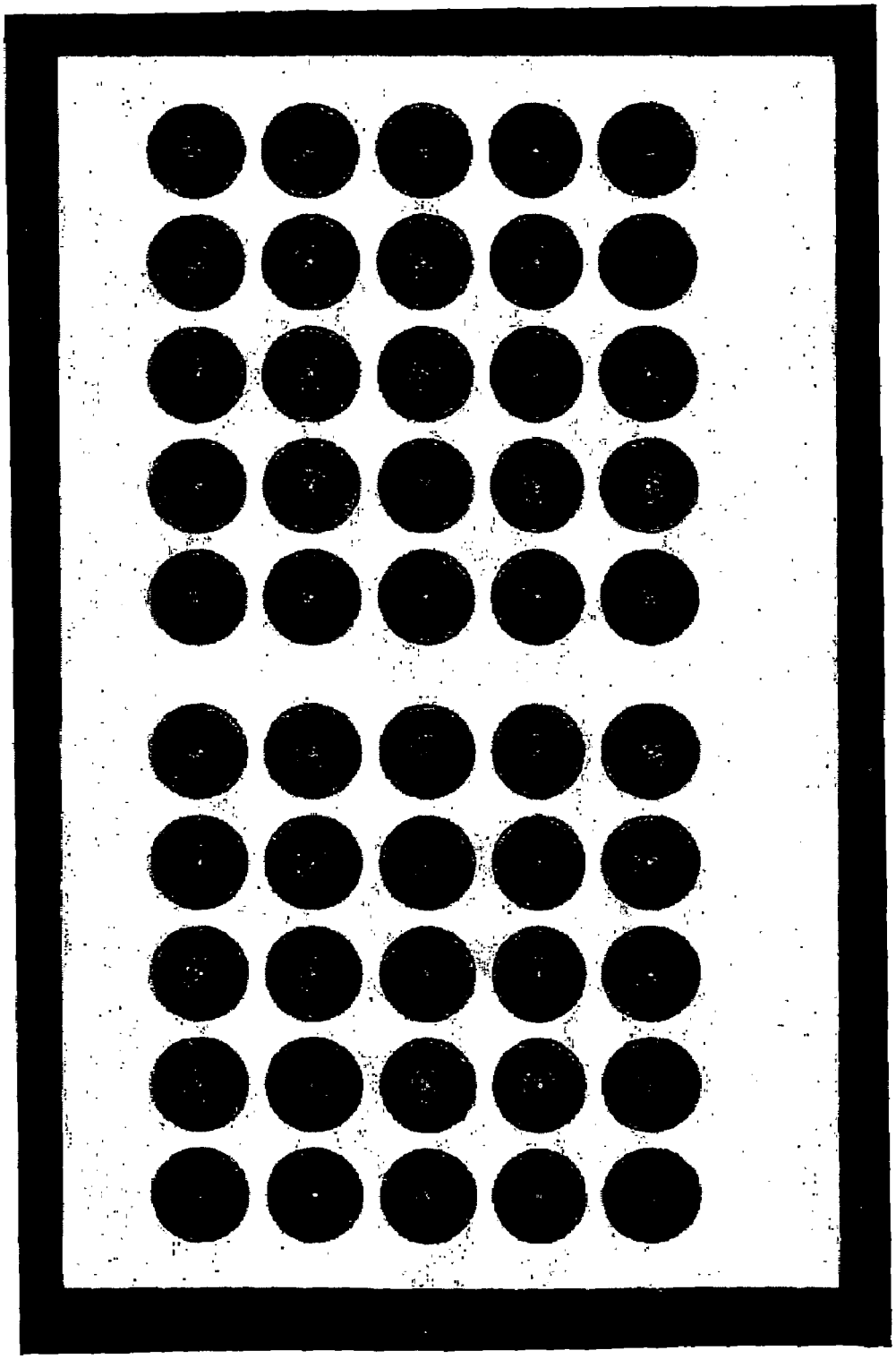
FIG. 3b shows a test tube rack comprising a plurality of samples to be investigated.

FIG. 3a shows a top view of an example of a microtiter plate 31 with 96 containers 33 to contain samples to be tested. FIG. 3b shows a bottom view of an example of a test tube rack 31 with 50 ampoules 33 to contain samples to be tested. The microtiter plate and test tube rack 31 may be made of plastic or any other suitable material known to persons skilled in the art.

Figure 4:
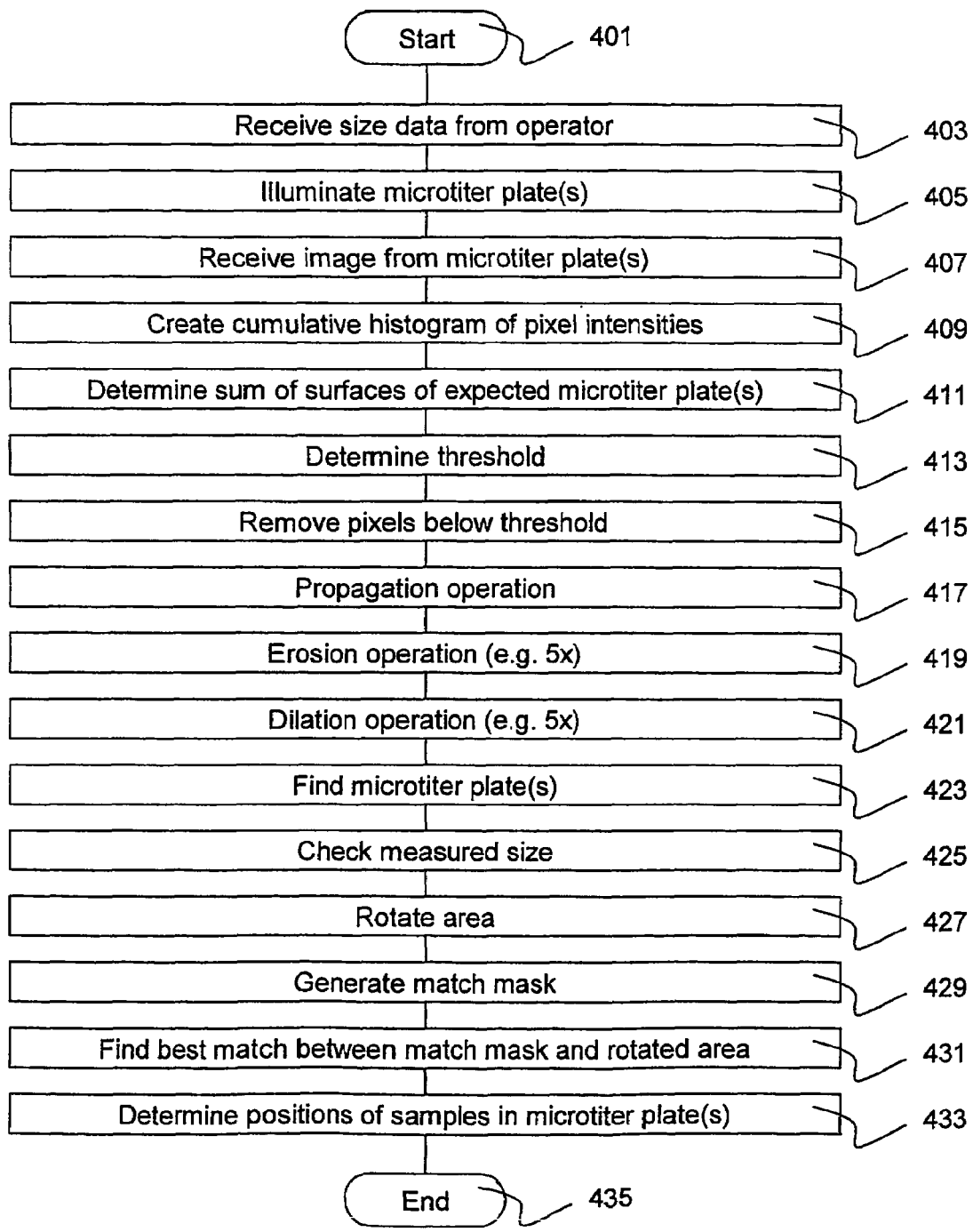
FIG. 4 shows a flow diagram of a method to determine an object location in accordance with the invention

Now, the operation of the arrangement shown in FIGS. 1, 2 and 3 will be given with reference to FIG. 4. It is assumed that the object is a microtiter plate 31, but the person skilled in the art will understand that other types of sample holding devices may be employed. Suitable examples are test-tube racks containing test tubes designed in such a fashion that the contents are at least visible from the side with which they are placed on the scanner.

An operator locates one or more microtiter plates 31 on the plate 35. A standard microtiter plate 31 may comprise 96 containers (or "cups") 33 arranged in 12 rows and 8 columns. The containers 33 are filled with samples to be tested. The microtiter plate 31 may be such that it can be broken after the second, fourth, sixth, etc. row in order to make smaller microtiter plates 31 with less containers, if desired. So, the microtiter plates on the plate 35 need not have the same sizes. The operator needs to inform the arrangement about the size data of the microtiter plates 31 or the arrangement may be equipped with software that enables automatic detection of the size data of the test array based on the present matrix. After the arrangement has started, step 401, the arrangement waits for the operator to input these size data, step 403. The operator can input this size data with the keyboard 13 or the mouse 15, or any other kind of input means, depending on the interface offered to the operator via monitor 3. As outlined above, the arrangement may also start its own routine for determining the size data.

In step 405, the light source 43 is powered and moved together with the sensor 37 parallel to the plate 35 such that images of all microtiter plates 31 are sensed with the sensor 37. The images are received by the processor 39 step 407. The images may be stored in memory 43 in the form of image pixel data including image pixel location and image pixel intensity for each pixel in the image. Then, the images are sent to processor 1 that stores these same data in memory 5, 7, 9, and 11 and creates a cumulative histogram of all pixel intensities, step 409.

In step 411, the processor 411 determines a sum of surfaces of expected microtiter plates 31. This can be done by using the information regarding the sizes of the microtiter plates 31 as received from the operator in step 403 and the cumulative histogram of step 409.

In step 413, a threshold value is determined. In an embodiment, the images of the microtiter plates 31 are lighter than the images of the background of these microtiter plates 31. Therefore, the microtiter plates 31 may be recognized by their higher image pixel intensity values compared with lower image pixel intensity values for the background. In step 415, image pixels having an intensity value below the threshold, which correspond to the background, are removed from further processing. Of course, instead of having a much darker background one can use a much lighter background when the microtiter plates would be darker. Then, all image pixels with an intensity value above the threshold would be removed.

Then, optionally, one or more of the following operations is performed on the remaining data:
- a propagation operation in order to close "holes" in the image (step 417);
- one or more, e.g. 5 times, erosion operations to delete small interference/noise objects (step 419);
- one or more, e.g. 5 times, dilation operations to repair erosions for larger objects (step 421).

Such operations are known to persons skilled in the art.

In step 423, the locations of the microtiter plates 31 are determined. This corresponds with finding the external boarders of the image pixel locations having an image pixel intensity above the threshold.

The result of step 423 can be checked. In step 425, the processor 1 counts the number of all image pixels falling within these external boarders and compares this number with a number of image pixels to be expected based on the information received from the operator in step 403. If these numbers are equal within a certain error margin, then, the processor 1 can be sure that the microtiter plates 31 are found correctly.

Using known image processing techniques, the area of each microtiter plate image is rotated, step 427, such that the images have boarders parallel to a predetermined X-Y plane.

In step 429, for each of the microtiter plates 31 a match mask is generated. Each match mask is a simulated image of a microtiter plate 31 and comprises as many containers 33 as there are in the corresponding real microtiter plate 31. The information as to the number of containers 33 per microtiter plates 31 is derived from the information received in step 403. The relative positions of the containers 33 in the match masks to the boarders thereof is then also known to the arrangement.

In step 431, for each match mask and its corresponding microtiter plate 31, a best match is determined between said match masks and the rotated images by virtually shifting said match masks in the X-Y plane. Preferably, a cross correlation operation is used. After these best matches are found, the positions of the containers 33 in the microtiter plates can be determined, step 433, using container position data from the match masks. Since the containers 33 always have a fixed distance to the boarders of the microtiter plates 31, there is no need to derive the positions of the containers 33 separately from the images as sensed by sensor 37, which would be much more cumbersome and susceptible to errors.

Instead of rotating the images of the microtiter plates 31, the arrangement can be programmed to rotate and shift the match masks to find the best match between the match masks and the images of the microtiter plates 31. In general, it does not matter what kind of axes system is used and what kinds of operations are performed to find the best matches.

After having accurately determined the positions of the containers 33 in this way, further measurements as to the content of the containers can be made, as explained in co-pending European patent application number 01203936.8 "Apparatus and method for detecting undesired residues in a sample" of the same applicant.

The invention is not limited to using light of a visible spectrum. It is emphasized that the arrangement may also give good results using infrared or ultraviolet light.

The invention claimed is:

1. An arrangement to locate an object with a predetermined number of marks, comprising a light source to illuminate the object, a sensor to receive an image of the object and to generate image pixel data, the image pixel data comprising image pixel locations and image pixel intensities for each image pixel location, a processor to receive the image pixel data and to store the image pixel data in a memory, the processor being arranged to perform functions comprising:

comparing said image pixel intensities with a predetermined threshold;
   determining object position based on said comparing;
   using a digital match mask that corresponds with said object with said marks;
   finding a best match between said digital match mask and said object on said object position; and
   determining mark positions within said object position from said best match.

2. The arrangement of claim 1, wherein the object is a holder and the marks are containers for holding test samples.

3. The arrangement of claim 2, wherein the test samples comprise at least one of the set of samples selected from the group consisting of parts of an animal body, parts of a human body, and parts of plants and trees.

4. The arrangement of claim 1, wherein the sensor comprises a series of CCD elements.

5. The arrangement of claim 1, wherein the processor is arranged to determine mark positions in a plurality of objects.

6. The arrangement of claim 1, wherein the processor is arranged to perform a propagation operation after said comparing said image pixel intensities with said predetermined threshold.

7. The arrangement of claim 6, wherein the processor is arranged to perform at least one erosion operation after said propagation operation.

8. The arrangement of claim 7, wherein the processor is arranged to perform at least one dilation operation after said erosion operation.

9. The arrangement of claim 1, wherein said light source and said sensor are part of a scanner.

10. A method to be carried out by an arrangement to locate an object with a predetermined number of marks, the arrangement comprising a light source, a sensor and a processor, the method comprising:

illuminating the object with the light source;
    receiving an image of the object and generating image pixel data, the image pixel data comprising image pixel locations and image pixel intensities for each image pixel location with said sensor;
    receiving the image pixel data and storing the image pixel data in a memory;
    comparing said image pixel intensities with a predetermined threshold; determining object position based on said comparing;
    using a digital match mask that corresponds with said object with said marks;
    finding a best match between said digital match mask and said object on said object position; and
    determining mark positions within said object position from said best match.

11. A computer program product loaded on a computer-readable memory component by an arrangement, which locates an object with a predetermined number of marks, the arrangement comprising a light source, a sensor and a processor, the computer program product, after being loaded by said arrangement, providing said arrangement with functions comprising:

illuminating the object with the light source;
    receiving an image of the object and generating image pixel data, the image pixel data comprising image pixel locations and image pixel intensities for each image pixel location with said sensor;
    receiving the image pixel data and storing the image pixel data in a memory;
    comparing said image pixel intensities with a predetermined threshold;
    determining object position based on said comparing;
    using a digital match mask that corresponds with said object with said marks;
    finding a best match between said digital match mask and said object on said object position; and
    determining mark positions within said object position from said best match.

12. A data carrier provided with a computer program product to be loaded on a computer readable memory component by an arrangement to locate an object with a predetermined number of marks, the arrangement comprising a light source, a sensor and a processor, the computer program product, after being loaded by said arrangement, providing said arrangement with functions comprising:

illuminating the object with the light source;
    receiving an image of the object and generating image pixel data, the image pixel data comprising image pixel locations and image pixel intensities for each image pixel location with said sensor;
    receiving the image pixel data and storing the image pixel data in a memory;
    comparing said image pixel intensities with a predetermined threshold;
    determining object position based on said comparing;
    using a digital match mask that corresponds with said object with said marks;
    finding a best match between said digital match mask and said object on said object position; and
    determining mark positions within said object position from said best match.

* * * * *